United States Patent [19]
Saidla

[11] 3,802,975
[45] Apr. 9, 1974

[54] METHOD OF MAKING A CONTAINER
[75] Inventor: Glen W. Saidla, Yellow House, Pa.
[73] Assignee: Dana Corporation, Toledo, Ohio
[22] Filed: May 3, 1971
[21] Appl. No.: 139,427

[52] U.S. Cl............... 156/69, 156/173, 156/192, 156/245, 264/261, 264/268, 264/328
[51] Int. Cl............................................ B29c 27/16
[58] Field of Search ........... 156/244, 245, 145, 146, 156/173, 189, 69, 187, 191, 192, 198; 264/251, 261, 267, 321, 328, DIG. 14; 220/68, 83; 52/268

[56] References Cited
UNITED STATES PATENTS

| | | | |
|---|---|---|---|
| 3,200,023 | 8/1965 | Cilker | 264/328 |
| 3,372,075 | 3/1968 | Holt et al. | 156/192 |
| 2,604,426 | 7/1952 | Beekman | 264/261 |
| 3,476,852 | 11/1969 | Shattuck | 264/261 |
| 3,535,179 | 10/1970 | Dryden | 156/173 X |
| 3,580,767 | 5/1971 | Barnes et al. | 156/173 X |
| 3,295,279 | 1/1967 | Wilkens | 52/268 |

*Primary Examiner*—Alfred L. Leavitt
*Assistant Examiner*—Caleb Weston
*Attorney, Agent, or Firm*—Harold D. Shall

[57] ABSTRACT

A container structure, as for use in storing or transporting articles, has a pair of end caps at the axial ends of the intermediate or hollow body portion thereof. The end caps have inner and outer skins separated by and bonded to plastic foam material. The inner and outer skins of the end caps each has an annular lip portion extending axially inwardly toward the medial portion of the body, with the lip of the inner skin extending axially inwardly farther than the lip of the outer skin. The end caps are placed on a mandrel and an inner body skin is wrapped around the inner lip of the end caps while the outer body skin is wrapped about the outer lip of the end caps. Plastic foam material also separates and is bonded to the inner and outer body skins. Also, the disclosure relates to the method of producing the container structure.

2 Claims, 16 Drawing Figures

INVENTOR.
GLEN W. SAIDLA
BY Harold D. Stoel
ATTORNEY

INVENTOR.
GLEN W. SAIDLA

BY Harold L. Stahl

ATTORNEY

INVENTOR.
GLEN W. SAIDLA

BY Harold L. Stall
ATTORNEY

METHOD OF MAKING A CONTAINER

SUMMARY OF THE INVENTION

This invention is concerned with fabricated container structures having improved structural characteristics and more particularly to such a structure with inner and outer skins with insulating structural material therebetween. It also relates to a container structure wherein the end caps are securely connected to the medial hollow body portion of the container.

In the prior art manufacture of container structures having inner and outer skins separated by insulating material, such as that shown in U.S. Pat. No. 3,295,279, the manner of securing separately formed end caps to the body portion of the structure has presented problems.

In the present invention, by forming the end caps with a pair of axially extending lips, the inner of which is overlapped and bonded to the inner skin of the body portion and the outer lip of the end cap being overlapped and bonded to the outer skin of the body portion, the end caps are intimately secured to the body portion.

The present invention also provides the insulating material between the inner and outer skins of the body portion of the container by the novel method of first wrapping a mandrel with the inner skin, placing a foam box about the inner skin, foaming the plastic material as a core between the inner skin and the foam box, removing the foam box, then wrapping the outer skin around the foamed material to provide a sandwich structure of inner and outer skins with the foam material therebetween.

It is, therefore, an object of this invention to provide a wall unit comprising a relatively thin inner and outer skin with foam insulating material between the skins, which structure is manufactured by rapid assembly and mass production methods.

It is another object of this invention to provide a container wherein the wall or body portion is positively secured to end caps and a manufacturing method for obtaining such structure.

Further and other objects of this invention will become apparent from the detailed description and the following drawings, wherein.

Figures 1, 2:
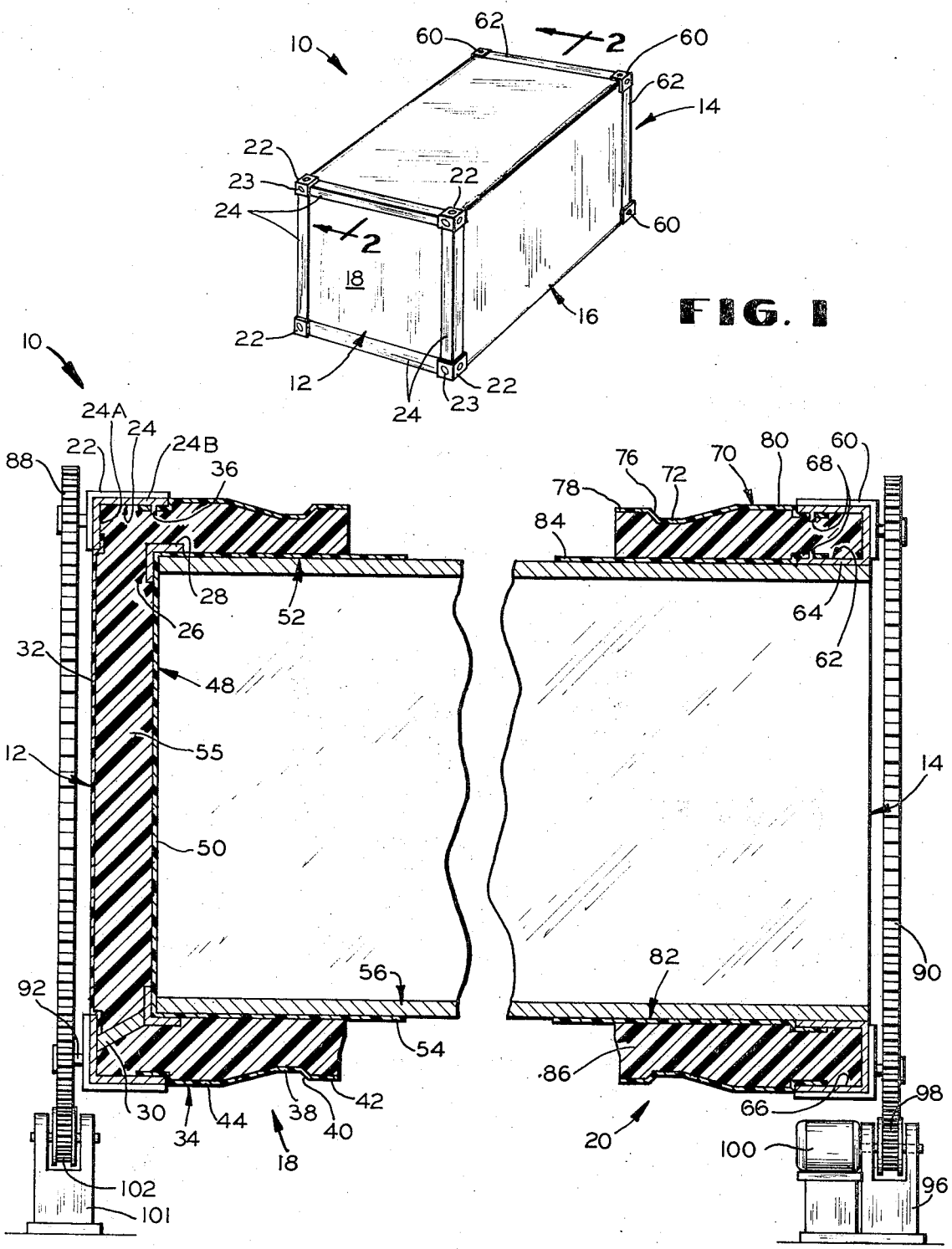
FIG. 1 is a perspective view of a container incorporating this invention.
FIG. 2 is a longitudinal cross-sectional view of the end cap portions of the container disposed on a mandrel utilized in manufacturing the same, the end caps being viewed as though the section was taken along lines 2—2 in FIG. 1.

Referring now to the drawings and more particularly to FIGS. 1–5, a container is shown generally at 10 and has a closed end 12, an open end 14, and a medial body portion 16. While the container, as shown, has a general rectangular cross-section, it is readily apparent that many other cross-sectional configurations can incorporate the features of this invention. It is understood that while a closed end is shown at 12, the container can have both ends made in the manner of the open end 14. Suitable closure means, such as doors (not shown), can be mounted in the open end 14 to close the same while providing for easy access into the container. The closed end 12 is formed by an end cap 18, while the open end 14 is formed by an end cap 20.

More particularly, the end cap 18 is generally rectangular in transverse cross-section and includes four corner castings 22, one at each outer corner thereof. Joining the corner castings 22, as by being welded thereto, are four right angle shaped metallic members 24, the corner castings and the angle shaped members forming a rectangular frame. Spaced radially and longitudinally inwardly of the right angle members 24 is a rectangular member, shown generally at 26 in FIG. 2, made from fabricated right angle metallic members 28. Interconnecting and welded to the right angle members 24 and 28, at spaced intervals, are a plurality of metallic struts 30.

The rectangular area between the right angle members 24 is enclosed by an end skin 32 which can be made from a sheet of resin impregnated material, preferably fiberglass. The end skin 32 may be hand laid up in a mold (not shown) with the peripheral portions of the skin overlapping the adjacent radially extending leg portion 24A of the angle member 24 and with portions of the skin being wrapped around the struts 30 to interlock the skin and the angle members 24.

An outer lip portion 34, which is rectangular when viewed in transverse cross-section, extends longitudinally inwardly from the longitudinally extending leg 24B of the right angle member 24. The longitudinally outer edge of the lip portion 34 overlies the inner surface of the leg 24B and is wrapped around a plurality of inwardly projecting short lugs 36 that are welded to the inner surface of the leg 24B at spaced intervals. The lip 34 is made from a sheet of resin impregnated material, preferably fiberglass, which may be hand laid up and cured in a suitable mold. The outer lip 34 is shaped to have a peripheral indentation or groove 38 spaced longitudinally outwardly from the inner end thereof. The right wall 40 of the groove 38 is angled sharply upwardly to a longitudinally inward shoulder 42 of the outer lip 34, while the left wall of the groove slopes upwardly at a lesser angle to a shoulder 44 of the lip; the shoulder 44 being spaced outwardly with respect to the center of the container 10 to a greater distance than the shoulder 42. Accordingly, the outer skin of the end cap 18 includes the end skin 32, the angle members 24 and the outer lip 34.

The end cap 18 also has an inner skin 48 which has a rectangularly shaped end skin portion 50 and an inner lip portion 52 formed integrally therewith and extending longitudinally inwardly therefrom. The inner lip portion 52 is rectangular when seen in transverse cross-section and has an inner end portion 54 that extends longitudinally inwardly beyond the outer lip portion 34. The junction of the end skin 50 and the inner lip portion 52 is generally at right angles and fits into the angled portion of the rectangular member 26. The inner skin 48 is made from a sheet of resin impregnated material, preferably fiberglass, which may be hand laid up and cured in a suitable mold.

The space between the inner and outer skins of the end cap 18 is filled with a plastic foam insulating core material 55, such as a closed cell polyurethane foam, more fully explained hereinafter, with the foam in the lip portion of the end cap as shown in FIG. 2 extending longitudinally inwardly to the inner end of the outer lip 34; the inner portion 54 of the inner lip 52 projecting longitudinally inwardly beyond the core material. In one manner of making the end cap 18, the corner castings 22, with the angle members 24 and 28, are placed in a female mold (not shown) and the end skin 32 and lip portion 34 hand laid up into this mold. The inner skin 48 is hand laid up around a male mold (not shown), the male mold is then placed into the female mold with the inner skin 48 resting upon the angled frame 26, and the insulating material foamed therebetween.

As seen in FIG. 2, in the manufacturing process the end cap 18 is slipped over one end of a mandrel 56 which is rectangular in cross-section and closely fits with the inner lip portion 52 of the end cap. The specific details of the mandrel 56 do not form a part of this invention, however, it is desirable that the mandrel is of a structure which allows it to be collapsed and withdrawn from the open end of the finished container.

The end cap 20 forming the open end 14 of the container 10 includes four corner castings 60 and four channel shaped metallic members 62 joined to the corner castings as by welding to form a rectangular frame. The open side of the channel faces longitudinally inwardly and the inner surface of the inner and outer legs 64 and 66 of the channel are provided with a plurality of spaced short lugs 68 welded thereon.

The end cap 20 has an outer lip portion 70 which can be made from a sheet of resin impregnated material, such as fiberglass, which may be hand laid up and cured in a suitable mold. The longitudinally outer edge of the sheet overlies the inner surface of the outer leg 66 and is wrapped around the lug 68. The outer lip 70 is shaped to have a peripheral indentation or groove 72 therein spaced longitudinally outwardly from the inner end thereof. The left wall 76 of the groove 72 is angled sharply upwardly to a longitudinally inward shoulder 78, while the right wall of the groove slopes upwardly at a lesser angle to an outer shoulder 80; the shoulder 80 being at a greater distance from the center of the container 10 than the shoulder 78. Accordingly, the outer skin of the end cap 20 includes the lip portion 70, the outer leg 66 and the vertical wall 80 of the channel member 62.

The end cap 20 also has an inner lip portion 82 which can be made from a sheet of resin impregnated material, such as fiberglass, which may be hand laid up and cured in a suitable mold. The longitudinally outer edge of the sheet overlies the inner surface of the inner leg 64 and is wrapped around the lugs 68. The inner lip 82 is rectangular when seen in transverse cross-section and has an inner end portion 84 that extends longitudinally inwardly beyond the outer lip portion 70. Accordingly, the inner skin of the end cap 20 includes the inner lip portion 82 and the inner leg 64 of the channel member 62.

The fiberglass portions of the end caps 18 and 20 may be made from suitable types of fiberglass material such as either woven fiberglass roving or chopped strand fiberglass mat. A material which has been found to be satisfactory is referred to as chopped strand mat, type M700 obtainable from the Owens-Corning Fiber Glass Corporation, utilized with a polyester resin; a suitable resin being obtainable from PPG Industries, Inc. and identified as number 50894. It should also be understood that the fiberglass portion of the end caps 18 and 20 can be formed by the spray up or other suitable method.

The space between the inner and outer skins of the end cap 20 is filled with a plastic foam insulating core material 86, such as closed cell polyurethane foam, more fully explained hereinafter, with the foam in the lip portion of the end cap extending longitudinally inwardly to the inner end of the outer lip 70; the inner portion 84 of the inner lip 82 projecting longitudinally inwardly beyond the insulating material. As seen in FIG. 2, in the manufacturing process, the end cap 20 is slipped over the end of the mandrel 56 oppositely from the end cap 18, with the mandrel closely fitting within the inner lip portion 82 and inner flange 64 of the end cap 20. It is also understood, that in the manufacturing process, suitable parting agents are first placed on the surface of the mandrel before the end caps are inserted thereover to prevent the various skin layers from adhering thereto in the manufacturing operation and to provide for easy subsequent removal of the mandrel.

A pair of supporting wheels 88 and 90 are attached to the end caps 18 and 20 for supporting and rotating the end caps and the mandrel as necessary during the various production steps. More particularly, the corner castings 22 and 60 are of hollow generally cubic form, with a plurality of oblong openings 23 extending through the walls thereof; one of the openings in each corner casting facing longitudinally outwardly. The wheels 88 and 90 have a diameter greater than the diagonal distance of an end cap when measured through the corner castings 22 for the end cap 18 and when measured through the castings 60 for the end cap 20. The wheel 88 is positioned coaxially with and adjacent to the end cap 18 with suitable attaching means such as a shouldered bolt 92 securing the wheel to each of the corner castings 22, while the wheel 90 is similarly positioned relative to and secured to the corner casting 60. The periphery of the wheels 88 and 90 are formed with gear teeth thereon.

Figure 10:
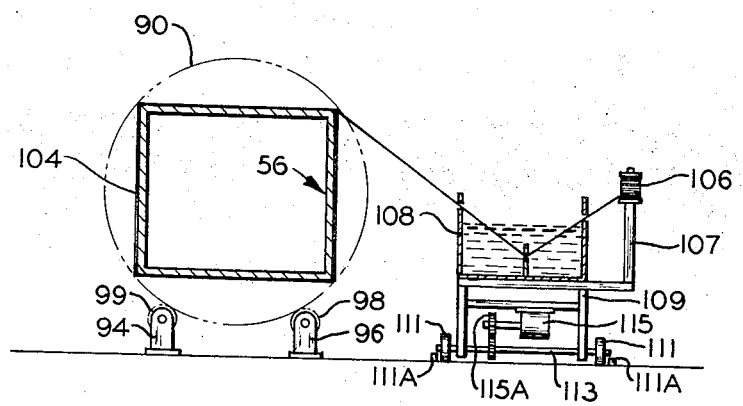
FIG. 10 is a schematic view of the mandrel of FIG. 6 as it appears in transverse cross-section at a position intermediate its ends with the inner skin applied thereto by winding equipment also shown schematically.

Referring briefly to FIG. 10, a pair of laterally spaced floor mounted pedestals 94 and 96 are disposed below the wheel 90 with the pedestals rotatably mounting thereon a small toothed wheel 99 and 98, respectively, meshed with and supporting the wheel 90. Referring to FIG. 2, the pedestal 96 has a motor 100 mounted thereon, with the motor drivingly connected to the small wheel 98 of this pedestal, whereby the wheel 98 may rotate the mandrel 56 and end caps 18 and 20. A pair of laterally spaced pedestals, one of which is seen at 101 in FIG. 2, are disposed below the wheel 88, with each pedestal mounting thereon a small toothed wheel 102 meshed with and supporting the wheel 88. The small wheels 99 and 102 need only be idler wheels performing no driving function unless suitable modification is made if desired.

Figure 3:
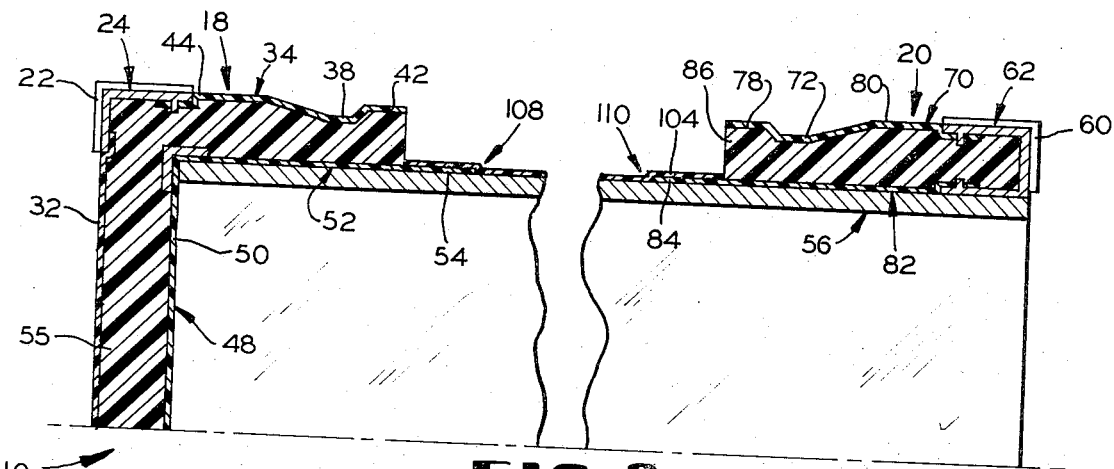
FIG. 3 is a partial longitudinal sectional view taken similarly to FIG. 2 with the inner skin of the body portion of the container being shown in place.

Referring now to FIG. 3, an inner body skin 104 is placed about the mandrel 56 and overlapping the inner portions 54 and 84 of the inner lip portions 52 and 82 of the end caps 18 and 20 respectively. While the inner body skin may be placed about the mandrel in any one of several suitable methods, the preferred method for rapid production purposes is shown schematically in FIG. 10. A supply of fiberglass roving, such as continuous strand roving, number 891, Type 30, obtainable from the Owens-Corning Fiber Glass Corporation, is shown at 106. This roving is lead through a container 108 of suitable resin, such as a polyester resin number 50894 obtainable from PPG Industries, Inc., so that the resin thoroughly coats the roving. The roving is then lead to the mandrel 56 and the mandrel rotated, thereby to wind the roving about the mandrel 56 forming the inner body skin 104, which extends over the lip portions 54 and 84. The winding is continued until the desired thickness is obtained; it is understood that suitable means are provided for insuring that the winding progresses for the desired longitudinal extent. Such may be accomplished by providing a supporting platform 109 which carries the resin container 108 and a spindle 107 upon which the roving supply 106 is rotatably mounted. The platform 109 is supported by a plurality of pairs of wheels, one pair being shown at 111, interconnected by an axle 113; the wheels 111 moving within a pair of spaced longitudinally extending tracks 111A. A reversible motor 115 is carried by the platform 109 and is drivingly connected to the axle by a gear set 115A, and suitable controls (not shown) are provided for energizing the motor 115 to move the platform longitudinally as desired.

Referring again to FIG. 2, since the outer lip portions 34 and 70 terminate longitudinally outwardly of the portions 54 and 84, they do not interfere with the application of the inner body skin 104. At the location where the inner body skin 104 overlaps the lip portions 54 and 84, there are a pair of spaced shoulders 108 and 110, however, since these are internal from the outer surface of the container 10, they have no effect on function or appearance.

Figure 4:
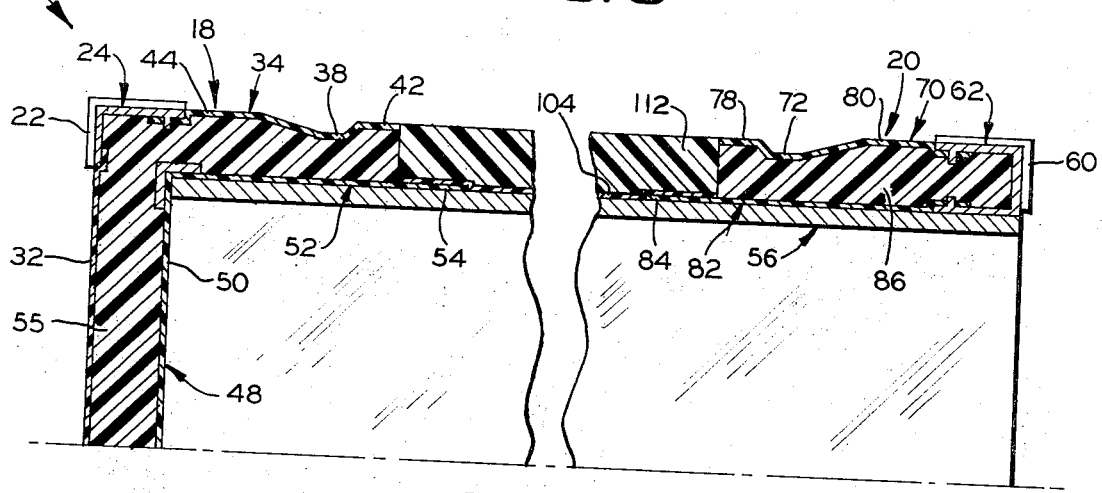
FIG. 4 is a partial longitudinal sectional view taken similarly to FIG. 3 with the intermediate insulating layer of the body portion shown applied on the inner skin.

Referring now to FIG. 4, a body layer of plastic foam insulating core material 112 is now placed on the inner body skin and bonded thereto. The body layer 112 abuts and is bonded to the foam material 55 and 86 in the end caps 18 and 20 and its external surface is level and even with the outer surface of the inner shoulders 42 and 78 of the outer lips 34 and 70.

Figure 12:
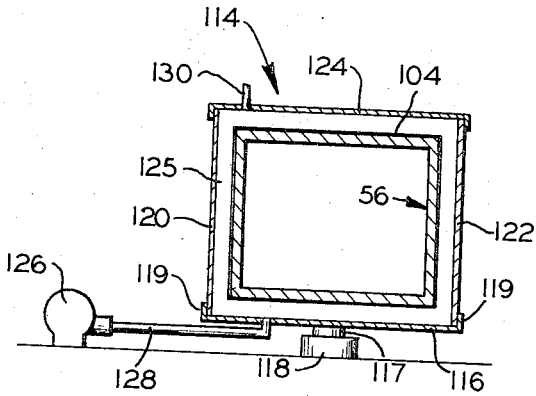
FIG. 12 is a schematic view similar to that shown in FIG. 11 showing the relationship of the foam box and the semi-completed container shown in FIG. 3 for applying the body layer shown in FIG. 4.

A preferred method of applying the body layer 112 will be now described. As seen in FIG. 12, a foam box 114 is positioned about the semi-finished container of FIG. 3; the mandrel 56, end caps 18 and 20 and body skin 104 are still supported at this time by the wheels 88 and 90 and pedestals 94, 96 and 100. The foam box 114 is a hollow structure, open at both ends and rectangular in transverse cross-section. The bottom wall 116 of the box 114 is carried by a vertically movable support, such as a piston 117 actuable by the hydraulic cylinder 118, for moving the bottom wall upwardly to the position shown in FIG. 12 to the desired space relationship to the mandrel 56 and downwardly relative thereto after the foaming operation is completed; the bottom wall having the longitudinally extending edges thereof bent upwardly to form flanges 119. A pair of side walls 120 and 122 sealingly rest on the bottom wall 116, are disposed in a desired space relationship to the mandrel 56 and abut the inner edges of the flanges 119. A top wall 124 sealingly rests on top of the side walls 120 and 122 and has the longitudinally extending edges thereof bent downwardly over the outside of the side walls 120 and 122.

Figure 13:
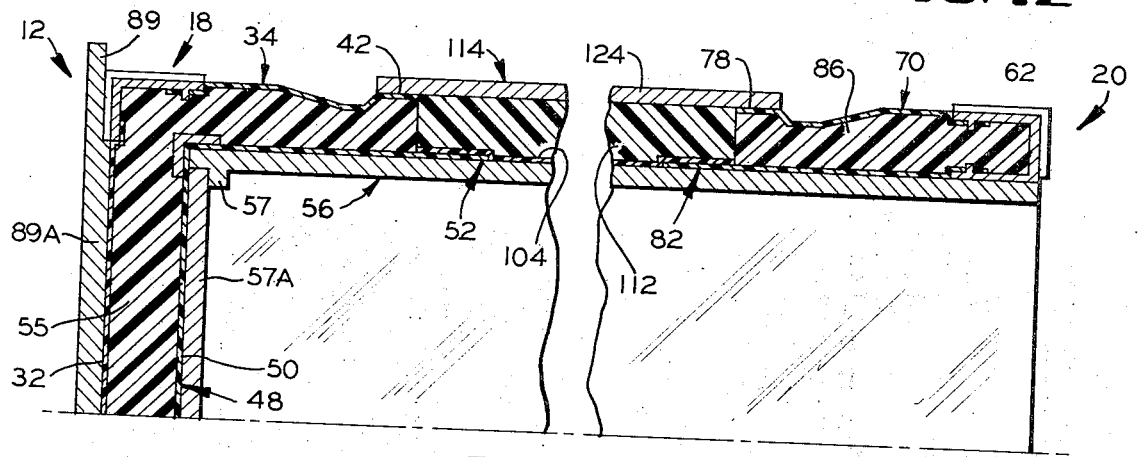
FIG. 13 is a partial longitudinal cross-sectional view taken similarly to FIG. 3 showing a wall of the foam box and its relationship to the end caps of the mandrel.

The relationship of the foam box 114 and the inner shoulders 42 and 78 of the outer lips 34 and 70 of the end caps 18 and 20 is shown in FIG. 13 with reference to the wall 124; it being understood that the relationship of the other walls of the foam box is substantially similar. As clearly seen in this FIG. 13, the wall 124 (as do the walls 116, 120 and 122), at its longitudinal ends overlaps and abuts the outer surface of the inner shoulders 42 and 78, so that the space between the inner surface of the wall and the outer surface of the inner body skin 104 is the area into which the body layer of plastic foam insulating core material 112 is introduced, with the foam material 55 and 86 in the outer lips 34 and 70 of the end caps 18 and 20, respectively, forming the lateral ends of the area into which the body layer 112 is placed, such area being indicated generally at 125 in FIG. 12.

Referring now to FIG. 12, with the foam box 114 in place, a foam machine 126 is actuated which supplies a properly mixed plastic foam material through a supply line 128 through the bottom wall 116 of the box 114 to fill the area 125; the amount of plastic introduced being sufficient to completely fill the area 125 when foamed and provide a slight overflow through a plurality of vents in the top of walls 124, one of such vents being shown at 130. A rapid introduction of plastic foam is desired to insure that all the area 125 is filled before the plastic begins to cure and entrap air spaces. It is beneficial to provide that as foam begins to overflow from a particular vent 130, such vent is closed; this being repeated successively until overflow has been attained from all the vents. The plastic foam of the body portion 112 will securely adhere to the foam material 55 and 56 of the end caps 18 and 20 and will also securely adhere to the body skin 104 and the inner edges of the lip portions 34 and 70.

In another method of providing the plastic foam insulating layer in the container 10, the inner and outer skins of the end caps 18 and 20 can be formed and the resin impregnated fiberglass portions thereof cured without the introduction of the insulating layer of plastic foam therebetween at such time. After the body skin 104 is wrapped over the inner end portions 54 and 84, the foam box 114 is positioned in place and the body layer 112 and end cap material 55 and 86 is introduced in the same operation. In this method, referring to FIG. 13, the mandrel 56 is provided with a shoulder 57 spaced inwardly from the end of the mandrel adjacent the closed end cap 18 and a plate 57A is positioned between the shoulder 57 and the end skin portion 50 of the inner skin 48 of the end cap 18 to prevent inner movement of the end skin during the foaming of the plastic. Similarly, a wheel 89, instead of being annular as the wheel shown in FIG. 2, is provided with a central plate portion 89A which abuts the outer side of the end skin 32 to prevent outward movement thereof during foaming of the plastic. No such provision need be made at the open end cap 20 (even if open end caps are used at both ends of the container) since the channel member 62 forms the longitudinal outer end of this end cap.

A suitable type of plastic molding compound for use as the end cap material 55 and 86 and for the body layer 112 is obtainable from PPG Industries, Inc. and identified as SELECTROFOAM 65008–6409 System. This is a two component polyurethane foam system which is properly mixed in the foam machine 126 to start the chemical foaming action. Additionally, to speed up the foam expansion process and create a froth foam for more rapid filling of the end caps and body layer, and subsequent to filling, less expansion through chemical foaming, a suitable blowing agent such as Freon 12 is added to the two components at the mixing head. Polyurethane foam has been found to be very satisfactory because of its inherent structural strength, low thermal conductivity, low density, bonding ability and its ability to completely fill a cavity into which it is introduced.

Figure 5:
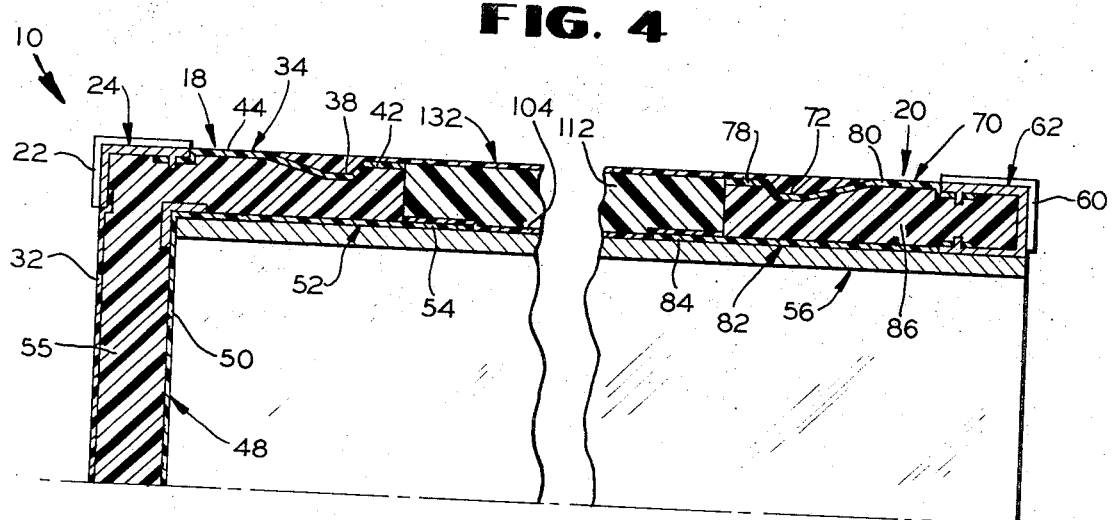
FIG. 5 is a partial longitudinal sectional view taken similarly to FIG. 4 with the outer skin shown applied over the insulating layer and outer lips of the end caps.

Referring now to FIG. 5, the finished container 10 is shown with an outer body skin 132 in place. The outer body skin 132 is made from a suitable material such as resin impregnated fiberglass, reference being made to the previous discussion of the inner skin 104 for description of suitable materials, and overlies the body layer of insulating material 112 and the outer lip portions 34 and 70 of the end caps 18 and 20. The skin 132 at the grooves 38 and 72 of the lip portions 34 and 70 is thickened and completely fills the grooves so that the outer surface of the skin 132 is level with the outer shoulders 44 and 80 of the end caps 18 and 20. Since the inner body skin 104 overlaps and is bonded to the inner lip portions 52 and 82 of the end caps 18 and 20, and the outer body skin 132 overlaps and is bonded to the outer lip portions 34 and 70 and secured in the grooves 38 and 72, the end caps 18 and 20 are intimately and securedly attached to the body portion 16 of the container in a manner heretofore unknown in the art. Additionally, the structure of the end caps themselves, with the inner and outer skins separately and intimately secured to the rectangular assembly of the corner castings and connecting members, provide a connection hereinbefore unknown in the art.

Figure 14:
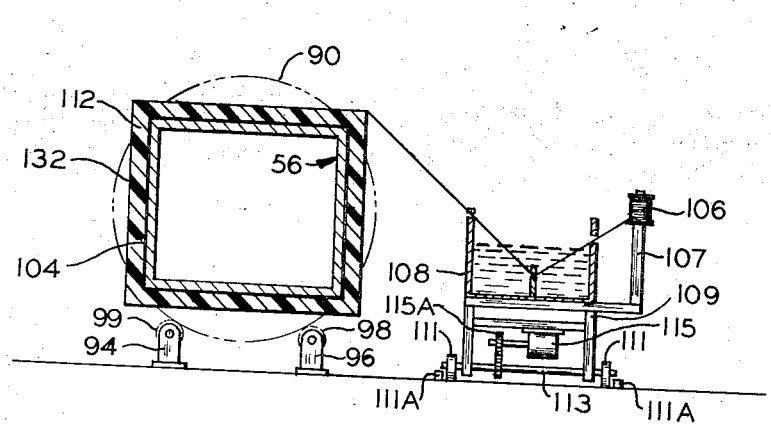
FIG. 14 is a schematic view taken similarly to FIG. 10 showing the outer skin being applied to the first embodiment of this invention.

While the outer body skin 132 may be placed about the body layer 112 and lip portions 34 and 70 in any one of several suitable methods, the preferred method for rapid production purposes is shown schematically in FIG. 14 after removing the cured semi-finished container from the foam box 114 and suitably treating the surface of the polyurethane foam body portion 112 to enhance its bonding properties, such as by sanding, wiping with a solvent such as methylene chloride, or chilling the foam box before removal which provides a friable surface to the foam. The wheel 90 is driven to rotate thereby rotating the semi-finished container to wrap fiberglass roving from the supply 106, which has passed through the resin container 108, around the outer lip portions 34 and 70 and the body layer 112. The motor 115 drives the platform 109 to move longitudinally of the container as required to wrap the outer skin 132, a dwell being provided in the platform's movement in the area of the grooves 38 and 72 so that the grooves are completely filled. Tracts 111A, shown in both FIGS. 10 and 14, guide the movement of the wheels 111 supporting the platform 109.

Figure 6:
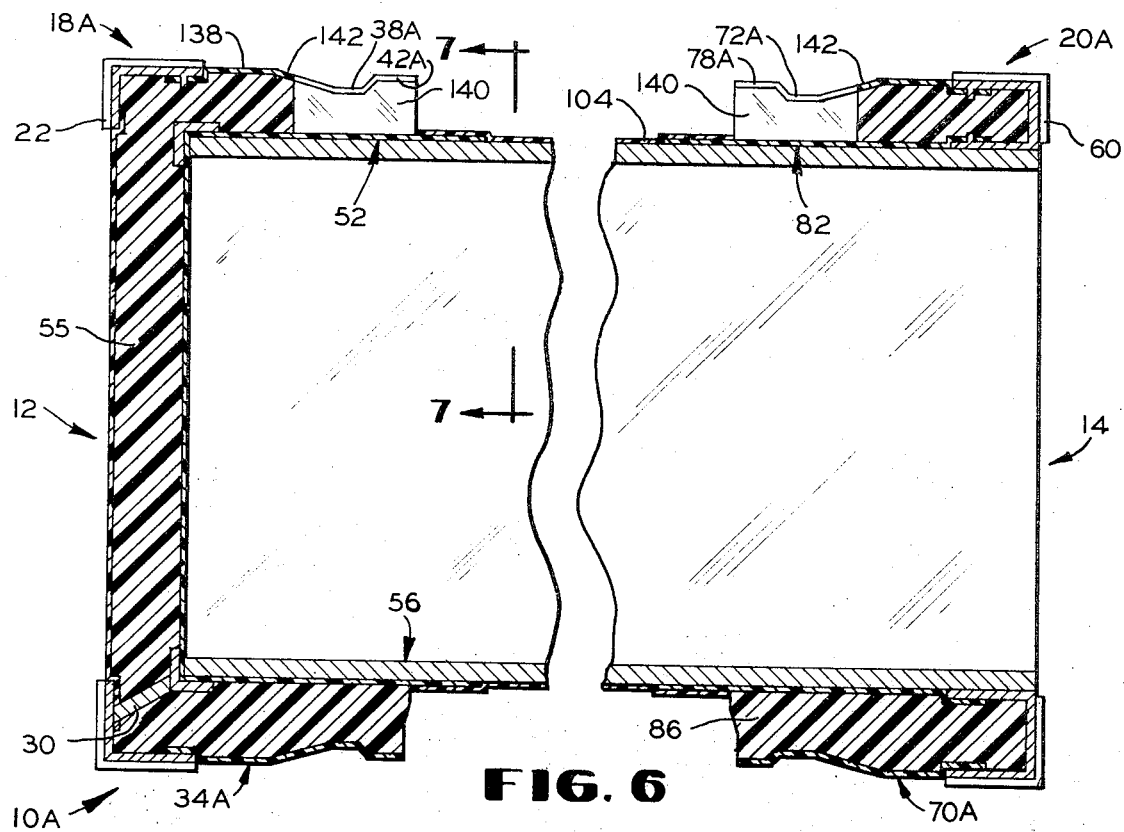
FIG. 6 is a longitudinal sectional view taken similarly to FIG. 2 of the end caps of a second embodiment of this invention, however, the section has been taken with the bottom of the container facing upwardly.
Figure 7:
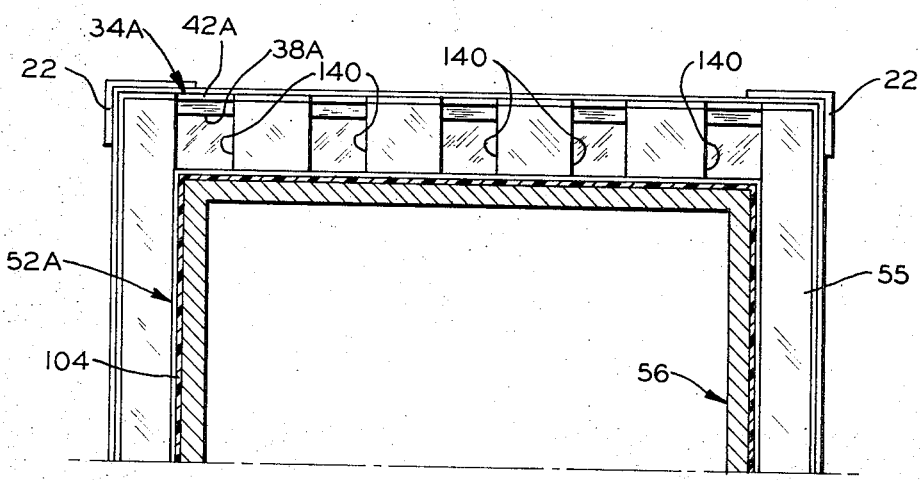
FIG. 7 is a partial transverse cross-sectional view taken along the lines 7—7 of FIG. 6.
Figure 8:
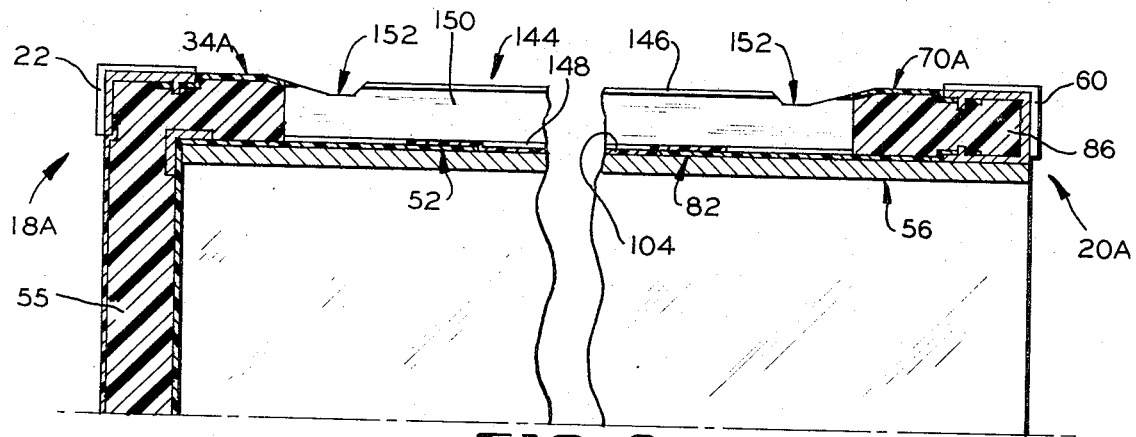
FIG. 8 is a partial longitudinal sectional view taken similarly to FIG. 6 of the second embodiment of this invention with the inner skin applied and a longitudinally extending I-beam being shown in position.
Figure 9:
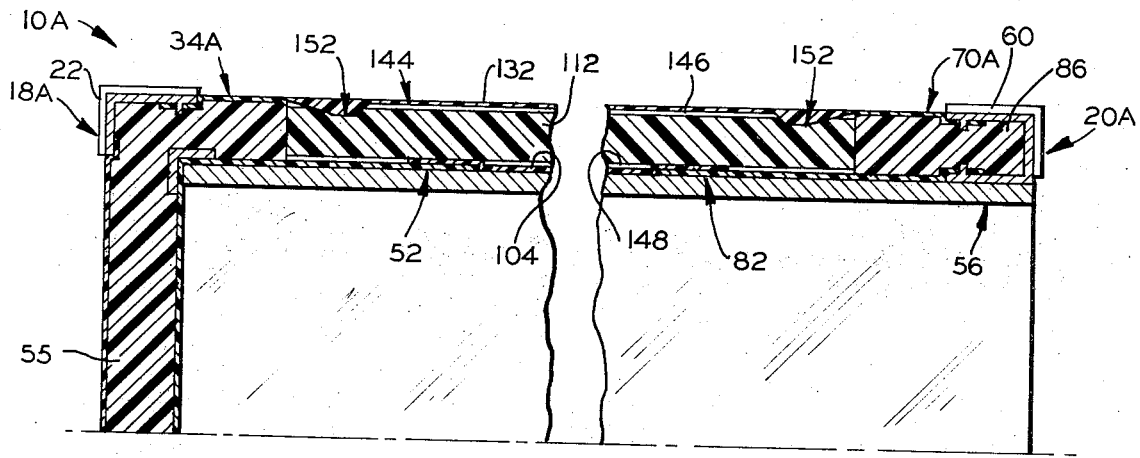
FIG. 9 is a partial longitudinal sectional view taken similarly to FIG. 8 of the second embodiment of this invention with the outer skin applied.

Referring now to FIGS. 6 – 9, a second embodiment is shown. In FIG. 6, a pair of end caps 18A and 20A are shown which are the same as end caps 18 and 20 except that the upper transverse wall 138 thereof, as seen in FIGS. 5 and 6, has been modified to provide a plurality of longitudinally extending transversely spaced slots 140 in each end cap with each slot in end cap 18A being in an aligned and paired relationship with a slot 140 in the end cap 20A; note that the lower wall as seen in FIGS. 5 and 6 is not slotted, as is the case with the two side walls. While the wall 138 is shown as being the upper wall in these drawings, such is placed in the upper position for production purposes, and after the container 10A of this embodiment is finished, as seen in FIG. 9, the upper wall can be the bottom strengthened wall of the container in such cases when the container carries its load on the bottom floor thereof, or it can be used as the upper wall when the weight is suspended from the upper wall.

The slots 140 are provided in the outer lip portions 34A and 70A of the end caps, and both the outer skin and insulating material are absent from the slots; the inner lip portions 52 and 82 of the end caps are not slotted. The slots 140 extend longitudinally inwardly almost to the outer end of the grooves 38A and 72A; the point of intersection indicated at 142 is the same distance from the center of the container as the outer surface of the shoulders 42A and 78A of the outer lips 34A and 78A. As seen in FIG. 7, the outer side of the laterally outermost grooves 140 are aligned with the outer surface of the inner lip portion 52A of the side walls of the end caps 18A. The same is true of the slots in the end cap 20A.

Referring now to FIG. 8, after the inner body skin 104 has been wrapped around the mandrel and over the inner lip portions 52 and 82, a longitudinally extending I-beam 144 is placed in each pair of the aligned slots 140. The beams 144 are conventionally shaped, having upper and lower flanges 146 and 148 and a web 150. The length of the I-beams are such that they reach the longitudinal outer ends of the slots 140 and the height thereof is such that the top surface of the upper flange 146 is co-extensive with the outer surface of the shoulders 42A and 72A. The width of the flanges 146 and 148 fits closely within the width of the slots 140. The medial bottom portions of the beams 144 rest upon and are bonded to the portion of the inner skin 104 intermediate the end caps 18A and 20A. Where the inner skin overlaps the inner lip portions 52 and 82, the lower flange 148 of the beams 144 are cut away to accommodate the same. At the end of the overlap of the inner skin 104, the lower flanges 148 are cut away, but to a lesser extent than at the overlap.

The end portions of the I-beams 144 within the slots 140 and longitudinally outwardly of the shoulders 42A and 78A are each provided with a groove or indentation 152 which matches the groove 38A or 72A adjacent thereto. The I-beams can be made of fiberglass filled polyester resin which have been suitably formed. The fiberglass and polyester resin for making the beams 144 can be the same type as that previously utilized to wind the body skins 104 and 132. The beams are preferably bonded to the inner body skin 104 and the inner lip portions 52 and 82 outwardly of the area where they overlap the body skin by the same type of polyester resin.

Figure 11:
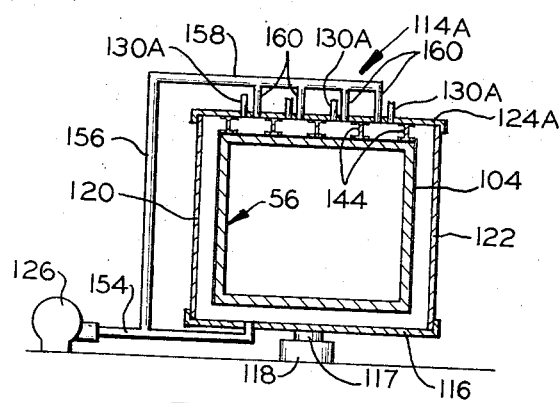
FIG. 11 is a schematic view in transverse cross-section similar to that shown in FIG. 10 of the mandrel with the inner skin and I-Beams as shown in FIG. 8, with a foam box in place, and also showing foam supplying equipment schematically.

After the I-beams 144 have been positioned as described, the semi-completed container is placed in a foam box 114A as shown schematically in FIG. 11, with the I-beams disposed upwardly. The bottom and side walls 116, 120 and 122 of the foam box 114A are the same as the corresponding walls of the foam box 114 in FIG. 12, as is the piston 117 and cylinder 118. The top wall 124A of the box 114A is provided with a plurality of vents 130A, with some disposed so as to be open between the location of adjacent I-beams and between the outermost I-beams and the side walls 120 and 122.

The top wall 124A also has a pair of longitudinal extensions (not shown) which extend beyond the shoulders 42A and 72A and which overlie and abut the outer ends of the I-beams 144 and the lip portions 34A and 70A to at least the point of intersection 142 of the notches 140 and the outer lips.

A foam machine 126 is actuated which supplies properly mixed polyurethane foam through a main supply line 154 through the bottom wall 116 of the box 114A to fill the space between the side and bottom walls of the box 114A and the container; it is noted that the polyurethane foam reaches the top wall 124A of the box outside of the outermost I-beams 144, but cannot flow across between the top wall and the container because these outermost I-beams act as a dam. A branch supply line 156 extends from the supply line 154 and carries polyurethane foam to a top manifold supply 158 with a plurality of branches 160; each branch extending through the top wall 124A at a location intermediate a pair of adjacent I-beams 144 to fill the area between the beams.

After the foam has cured, the foam box is removed and the outer body skin 132, as seen in FIG. 9, is applied to complete the container 10A. The skin 132 overlaps the end caps 18A and 20A and at the location of the grooves 152 in the I-beams the skin lies within the grooves 152 and the grooves 38A and 72A of the end caps.

Figure 15:
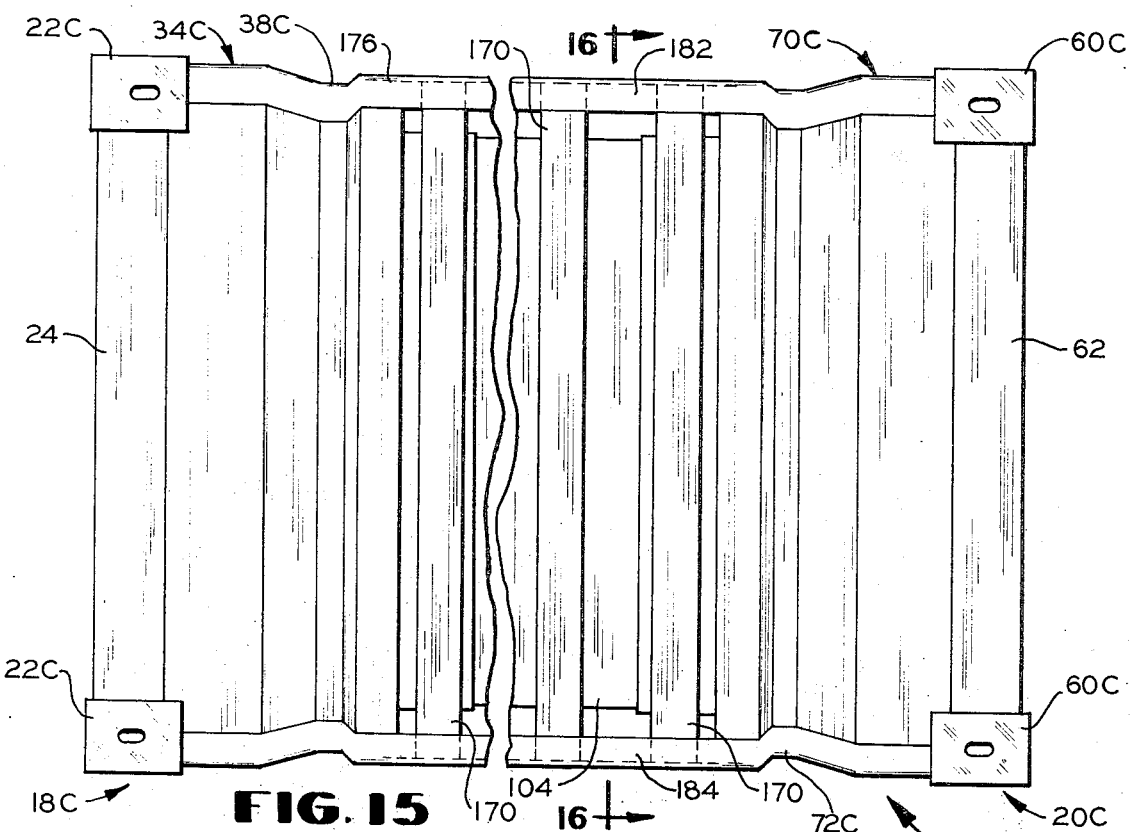
FIG. 15 is a plan view of a third embodiment of this invention, as viewed from the bottom, prior to the outer skin and body layer of insulating material being applied thereto; and, FIG. 16 is a transverse cross-sectional view taken along the lines 16—16 in FIG. 15 after the container has been finished.
Figure 16:
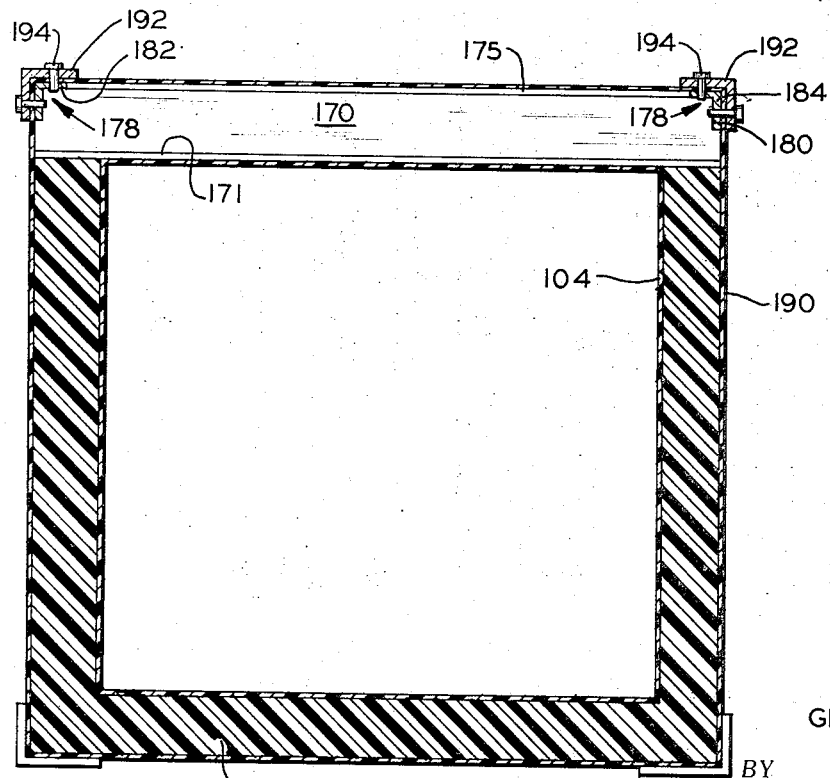

Referring now to FIG. 15, a third embodiment of this invention is shown at 10C prior to the outer body skin and body layer of insulating material being applied. The end caps 18C and 20C are constructed similar to the end caps of FIG. 2 (the minor differences will be explained hereinafter) and placed on a mandrel. The inner body skin 104 is then applied, subsequent to which a plurality of transversely extending I-beams 170 are spaced along the container with their bottom flanges 171 (as seen in FIG. 16) bonded to the body skin 104. The beams 170 extend beyond the inner skin, preferably to such an extent as to be co-extensive with the outer surface of the body layer of insulating material 174 which will be applied, and the top surface of the top flange 175 of the I-beams is coextensive with the top surface of the inner shoulder 176 of the end caps.

The upper side and outer end surface of each I-beam at both of the corners 178 thereof are provided with a notch 180, as seen in FIG. 16. Similarly, each of the top corners of the outer lips 34C and 70C of the end caps 18C and 20C, including the location at the groove portion 38C and 72C therein, are likewise notched. A pair of longitudinally extending pieces of angle iron 182 and 184 is provided, with the angle iron 182 being fitted and bonded into the notches 180 at one end of the I-beams 170 and the corresponding notch in the end caps. The angle iron 182 extends to the aligned corner castings 22C and 60C and is welded thereto. The angle iron 184 is similarly fitted and bonded into the notches 180 at the opposite end of beams 170 and into the notches in the corresponding grooves in the end caps 18C and 20C, with the ends thereof welded to the aligned corner castings 22C and 60C. The portion of the angle irons 182 and 184 at the grooves 38C and 72C are deformed so that the outer surfaces thereof are co-extensive with the surface of the grooves.

The semi-finished container as shown in FIG. 15 is then placed in a foam box 114 as shown in FIG. 12, the top wall 124 of the box touching the top surfaces of the beams 170 and angle irons 182 and 184, and the side walls 120 and 122 of the box touching the lateral ends of the beams and lateral sides of the angle irons. Polyurethane foam is then injected into the box 114 through the line 128 and completely fills the space between the box and the semi-finished container, including the space between adjacent I-beams. After curing the polyurethane foam and removing the box 114, an outer skin 190 is placed around the body layer of insulating material, the I-beams 170 and the angle irons 182 and 184 in the same manner as shown in FIG. 14.

Another pair of longitudinally extending angle irons 192 are then placed on the corners of the container 10C, under which corners are the angle irons 182 and 184. These angle irons 192 are longitudinally straight and fit to the corners of the outer skin 190 and the ends thereof are welded to the corner castings 22C and 60C. A plurality of aligned holes are then drilled through the angle irons 182, 184 and the angle iron 192 adjacent thereto. These holes also pass through the outer skin 190 and a rivet 194 is placed in each set of aligned holes to securely fasten the angle irons to each other.

Having described this invention and the several embodiments shown in the drawings, what is claimed is:

1. The method of forming a hollow body portion of a container, which body portion is secured to a pair of end caps, comprising the steps of (a) placing the end caps on opposite ends of a mandrel, (b) applying an inner body skin about said mandrel and secured to said end caps, (c) placing a hollow mold about said inner body skin while the latter is supported on said mandrel, with the inner surface of the mold being spaced from at least a portion of the periphery of said inner skin, (d) filling said space between the mold and said inner body skin with a layer of plastic foam material and at least partially curing said plastic foam material, (e) removing said mold, and (f) applying an outer body skin around said plastic foam material and bonded thereto and secured to said end caps.

2. The method according to claim 1 wherein said mold is placed about said inner body skin and overlapping said end caps so that said end caps form the lateral ends of said space between the mold and said body skin and when the layer of plastic foam material is introduced to the space it is bonded to the end caps.

* * * * *